(12) United States Patent
Atance Orden et al.

(10) Patent No.: US 10,632,664 B2
(45) Date of Patent: Apr. 28, 2020

(54) INJECTION AND BLOW MOLD FOR AN INJECTION MACHINE

(71) Applicant: MOLMASA APLICACIONES TECNICAS, S.L., Barcelona (ES)

(72) Inventors: Angel Atance Orden, Barcelona (ES); Marcos Atance Romero, Barcelona (ES)

(*) Notice: Subject to any disclaimer, the term of this patent is extended or adjusted under 35 U.S.C. 154(b) by 25 days.

(21) Appl. No.: 15/781,432

(22) PCT Filed: Dec. 4, 2015

(86) PCT No.: PCT/ES2015/000173
§ 371 (c)(1),
(2) Date: Jun. 4, 2018

(87) PCT Pub. No.: WO2017/093578
PCT Pub. Date: Jun. 8, 2017

(65) Prior Publication Data
US 2018/0354184 A1    Dec. 13, 2018

(51) Int. Cl.
*B29C 49/06* (2006.01)
*B29C 49/32* (2006.01)
*B29C 49/48* (2006.01)

(52) U.S. Cl.
CPC ............. *B29C 49/06* (2013.01); *B29C 49/32* (2013.01); *B29C 49/4823* (2013.01); *B29C 2049/4828* (2013.01); *B29C 2049/4841* (2013.01)

(58) Field of Classification Search
CPC ............ B29C 49/32; B29C 2049/4828; B29C 2049/4841; B29C 2049/4823; B29C 49/06
See application file for complete search history.

(56) References Cited

U.S. PATENT DOCUMENTS

| 3,492,690 A | 2/1970 | Goldring |
| 4,376,090 A | 3/1983 | Marcus |
| 4,540,543 A | 9/1985 | Thomas |

(Continued)

FOREIGN PATENT DOCUMENTS

| EP | 2554355 A1 | 2/2013 |
| EP | 2678144 B1 | 3/2015 |

(Continued)

*Primary Examiner* — Robert B Davis
(74) *Attorney, Agent, or Firm* — Eugenio J. Torres-Oyola; Victor M. Rodriguez-Reyes; Rafael Rodriguez-Muriel (57) ABSTRACT

The present invention relates to an injection and blow mold for an injection machine, the mold comprising one or more rows of molding cavities arranged in a base plate (5), each row of cavities including several injection cavities (1) and several blow cavities (2) arranged in an alternating manner and aligned with one another, with blow cavities (2) at opposite ends of the row. The injection cavities (1) are formed individually in respective injection blocks (3) and the blow cavities (2) are formed individually in respective blow blocks (4). The injection blocks (3) and the blow blocks (4) are separated from one another and project from the base plate (5). The injection blocks (3) are heated by external heating means relative to the base plate (5), and the blow blocks (4) are cooled by a cooling fluid circulating through cooling conduits (7a) arranged inside the blow blocks (4).

17 Claims, 5 Drawing Sheets

(56) References Cited

U.S. PATENT DOCUMENTS

| | | | |
|---|---|---|---|
| 4,604,258 A * | 8/1986 | Valyi | B29O 49/32 |
| | | | 264/537 |
| 5,067,891 A | 11/1991 | Julian | |
| 2008/0035602 A1 | 2/2008 | Gooden | |
| 2010/0068328 A1 * | 3/2010 | Parrinello | B29C 43/08 |
| | | | 425/525 |
| 2014/0042673 A1 * | 2/2014 | Fields | B29C 49/061 |
| | | | 264/537 |

FOREIGN PATENT DOCUMENTS

| | | |
|---|---|---|
| ES | 445382 A1 | 10/1977 |
| ES | 1074236 | 4/2011 |

* cited by examiner

INJECTION AND BLOW MOLD FOR AN INJECTION MACHINE

FIELD OF THE ART

The present invention relates generally to an injection and blow mold applicable to an injection machine, and more particularly to a mold including a plurality of injection cavities and a plurality of blow cavities arranged in an alternating manner with respect to one another in one or more rows, applicable to a horizontal injection molding machine.

BACKGROUND OF THE INVENTION

The injection blow molding system, known internationally as IBM, is widely known and used for the production of plastic containers, mainly for the pharmaceutical industry (vials, nasal dispensers, bottles for tablets, etc.) and the cosmetic industry (roll-on containers, jars for creams, etc.), among other applications.

A conventional injection blow molding system is based on a hydraulic machine with vertical presses for opening and closing the molds, a plasticizing screw for processing the thermoplastic material to be molded, i.e., plasticization of the plastic mass and injection of the molten plastic mass into an injection mold for molding a preform, and a transfer device for transferring the preforms from the injection mold to a blow mold in which the preforms are molded to the final shape of the container by injecting air therein.

The equipment implementing the mentioned conventional injection blow molding system comprise two different molds, a split injection mold which can include a plural number of injection cavities arranged in a horizontal row and a split blow mold which can include the same number of blow cavities arranged in another horizontal row, where the injection cavities define an outer surface of the preforms and the blow cavities define an outer surface of the containers. The split injection mold, the split blow mold, and an ejection station are arranged in the form of an equilateral triangle. The equipment further comprises an equilateral triangle-shaped rotary support plate having, on each of its three sides, a horizontal row of the same number of punches, where the punches define an inner surface of the preforms.

The rotary support plate rotates 120 degrees, and in each position the punches of one of the rows are coupled with the cavities of the injection mold, the punches of another one of the rows are coupled with the cavities of the blow mold, and the punches of the other row are in the ejection station. The preforms injected into the injection mold are transferred to the blow mold, and the finished containers are transferred of the blow mold to the ejection station by means of the punches. As many containers as there are cavities in each mold are produced in each work cycle.

One drawback of this widely used system is that all the injection cavities and all the blow cavities must be located in respective rows, and these rows have a maximum length determined by the amplitude of the machine, which defines the maximum number of cavities that are possible in each row, and therefore the maximum productivity of the equipment. In practice, the length of the molds is between 250 mm in small machines and 1400 mm in large machines. This allows housing, in larger machines, a maximum of 24 to 26 cavities in each row for small-sized containers.

Injection blow molding systems in which both the injection mold and the blow mold are arranged in one and the same frame which can be installed in a horizontal injection machine, which is the type of machine most widely used in the plastic transformation sector due to its great versatility, are also known.

Examples of these compact molding systems are published, for example, in patent documents U.S. Pat. No. 3,492,690 by John E. Goldring et al., and EP 2554355 A1 by Fabio Cantoni, in which a row of injection cavities is flanked by two rows of blow cavities, both the injection and blowing steps being performed simultaneously in cooperation with two rows of punches that are movable in an opening and closing direction and in a transfer direction perpendicular to the rows of punches.

Another known example is patent document EP 2678144 B1 belonging to the same inventor as the present application, which includes one or more rows of cavities where the injection cavities and the blow cavities are arranged in an alternating manner in each row, and where both the injection and blowing steps are preformed simultaneously in cooperation with one or more rows of punches that are movable in an axial opening and closing direction and in a transfer direction parallel to the rows of punches.

These compact systems are often used for small-scale container productions, so these molds usually have from 2 to 8 injection cavities per row.

An important technical aspect that must be taken into account in an injection blow molding system is that the injection cavities and the blow cavities do not work at the same working temperature. The injection cavities work at a relatively high temperature (from 70° C. to 130° C.) for the purpose of keeping the thermoplastic material of the preform at a temperature at which it does not solidify and the preform can thereby be blown, whereas the blow cavities work at a low temperature (from 4° C. to 15° C.) so that once the preform has been blown, the thermoplastic material in contact with the surface of the blow cavity solidifies rapidly, the final container thereby being formed.

The fact that the injection cavities and blow cavities are subject to different temperatures does not constitute a problem in conventional vertical closing injection blow molding systems vertical closure given that the injection cavities and blow cavities are located in different frames that are not in contact with one another. The frame with the injection cavities can thereby be heated with a hot fluid, for example, whereas the frame with the blow cavities can be cooled with a cold fluid, for example.

Although the two frames with cavities are not in contact with one another, the significant difference in temperatures between both frames, which are usually made of steel or aluminium, leads to the occurrence of a different thermal expansion in each frame, and the punches which are arranged in three rows forming an equilateral triangle must fit into both the frame with injection cavities and the frame with blow cavities. Given the length of the frames with cavities, which may reach 1400 mm in larger equipment, as mentioned above, the difference in thermal expansion between the frame with injection cavities and the frame with blow cavities can be of a significant magnitude.

This problem is solved in conventional injection blow molding systems by installing the punches with allowance in the rotary support plate, and by doing so, whenever the mold closes on the row of punches, said punches will be freely positioned in a correct alignment, fitting with the cavities as a result of their allowance and in collaboration with centring elements arranged both in the injection cavities and in the blow cavities.

However, in compact molds for injection blow molding on a horizontal injection machine, the punches cannot be positioned with allowance on their support plate because the quality and centring of the preform and the subsequent uniform wall thickness in the resulting container depend on the position and rigidity of said punches. This creates a problem directly proportional to the dimension of the mold since the magnitude of thermal expansion is proportional to the distance between the end cavities. In the event that the compact mold includes multiple rows of injection cavities and blow cavities arranged in an alternating manner, the magnitude of thermal expansion will be proportional to the distance between the diagonally located end cavities.

U.S. Pat. No. 4,376,090 A discloses an injection and blow mold for an injection machine comprising, aligned in a row, a central injection cavity flanked by two blow cavities and two ejection stations at opposite ends of the row, where the central injection cavity and the two blow cavities are formed in respective blocks fixed to a base plate. The blocks are separated from one another and project from the base plate. Nevertheless, the described cavity arrangement does not allow arranging a plurality of injection cavities and a plurality of blow cavities in an alternating manner and aligned in a row, with blow cavities at opposite ends of the row. This document does not mention the possibility of heating the injection cavity by heating means.

U.S. Pat. No. 4,540,543 A discloses an injection and blow mold for an injection machine comprising rows of molding cavities arranged in a base plate, each row of molding cavities including a number n greater than one of injection cavities and a number n+1 of alternating blow cavities, with blow cavities at opposite ends of the row, a plurality of injection nozzles supplying a molten molding material to the injection cavities, rows of punches arranged in a movable plate, each row of punches including a number 2n of punches, the movable plate being provided with an opening and closing movement in a direction parallel to an axial direction relative to the punches and a transfer movement in a direction perpendicular to the axial direction and parallel to the row of punches, a blow device blowing air into preforms in the blow cavities from outlets of air conduits arranged inside the punches, and an ejection device ejecting finished containers from the punches by means of ejector elements.

U.S. Pat. No. 5,067,891 A discloses an injection and blow mold for an injection machine comprising rows of molding cavities arranged in a base plate, each row of molding cavities including a number n greater than one of injection cavities and a number n+1 of alternating blow cavities, with blow cavities at opposite ends of the row, a plurality of injection nozzles supplying a molten molding material to the injection cavities, rows of punches arranged in a movable plate, each row of punches including a number 2n of punches, rows of pairs of complementary half-molds installed in a movable plate, each row of pairs of complementary half-molds including a number n of pairs of complementary injection half-molds and a number n+1 of alternating pairs of complementary blow half-molds, with pairs of complementary blow half-molds at opposite ends of the row, wherein the complementary injection half-molds and the complementary blow half-molds are cooled by cooling elements through the movable plate, and an ejection device ejecting finished containers from the punches by means of ejector elements.

DESCRIPTION OF THE INVENTION

The present invention contributes to mitigating the foregoing and other drawbacks by providing an injection and blow mold for an injection machine comprising a row or a plurality of parallel rows of molding cavities arranged in a base plate and a row or a plurality of parallel rows of punches arranged in a movable plate.

Each row of molding cavities includes a whole number n of injection cavities that is greater than one and a number n+1 of blow cavities. The injection cavities and blow cavities are arranged in an alternating manner and aligned with one another, with blow cavities at opposite ends of the row. The base plate is generally in a stationary position. Each row of punches includes a number 2n of punches arranged in a manner aligned with one another. The movable plate is provided with an opening and closing movement in a direction parallel to an axial direction in relation to a central axis of the punches and a transfer movement in a direction perpendicular to the axial direction and parallel to the rows of punches, or in other words, parallel to a geometric plane containing the central axes of the punches of each row.

The mold further comprises a plurality of injection nozzles supplying a molten molding material to the injection cavities, a blow device blowing air into the preforms from outlets of air conduits arranged inside the punches, and an ejection device ejecting the finished preforms from the punches.

By means of the movements of the movable plate, each of the punches is alternately coupled with one of the injection cavities and with one of the molding cavities. The punches coupled with the injection cavities define injection molds in which the molten molding material is injected to form preforms, where the punches define an inner surface of the preforms and the injection cavities define an outer surface of the preforms. The punches holding the preforms and coupled with the blow cavities define blow molds where the preforms are blown until they are transformed into containers, where the blow cavities define an outer surface of the containers.

The injection cavities are formed in injection blocks and the blow cavities are formed in blow blocks. The injection blocks and blow blocks are separated from one another and project from the base plate.

In one embodiment, each injection block has an individual injection cavity formed thereon and each blow block has an individual blow cavity formed thereon. In another alternative embodiment, each injection block has two or more injection cavities belonging to two or more rows formed thereon and each blow block has two or more blow cavities belonging to two or more rows formed thereon.

The injection blocks are heated by external heating means relative to the base plate. In one embodiment, these heating means comprise a heating fluid circulating through distribution tubes arranged outside the base plate and through heating conduits arranged inside the injection blocks. In another embodiment, the heating means comprise electrical resistances arranged in thermal contact with the injection blocks.

In one embodiment, a plurality of circuits of independent heating conduits are arranged inside each of the injection blocks in relation to different regions of the injection block, and this plurality of circuits of heating conduits are in fluid communication with corresponding independent distribution tubes arranged outside the base plate. A heating fluid heated to a plurality of different respective temperatures circulates through the distribution tubes and through the corresponding circuits of heating conduits. Different areas of the surface of each of the injection cavities are thereby heated to different temperatures in a controlled manner with this heating system for the purpose of assuring a correct and suitable expansion of the preform during the subsequent blowing step in the blow cavity to produce containers with the desired level of quality.

The blow blocks are cooled by cooling means comprising a cooling fluid circulating through cooling conduits arranged inside the blow blocks. In one embodiment, the cooling fluid is supplied to the cooling conduits through distribution conduits arranged inside the base plate. In another embodiment, the cooling fluid is supplied to the cooling conduits through distribution tubes arranged outside the base plate.

The mold of the present invention thereby allows including a large number of injection cavities and blow cavities in a compact configuration in a base plate, and given that the blocks defining the cavities are separated from one another and project from the base plate, the injection cavities can be heated to a high temperature and the blow cavities can be cooled to a low temperature without the position coordinates of the cavities being affected by a thermal expansion effect. Accordingly, the punches located in the movable plate of the mold can be rigidly fixed, which assures a correct dimensional quality and proper centring of the preforms obtained in the injection molding step, as well as a uniform wall thickness in the subsequent containers resulting from the preform blow molding step.

The movable plate is associated with an intermediate plate having installed thereon one or more rows of pairs of complementary half-molds provided with opening and closing movements in a radial direction relative to the punches. Each row of pairs of complementary half-molds includes a number n of pairs of complementary injection half-molds and a number n+1 of pairs of complementary blow half-molds arranged in an alternating manner and aligned with one another, with pairs of complementary blow half-molds arranged at opposite ends of the row. The pairs of complementary injection half-molds define outer surfaces of the preform that would have no outlet in the axial direction if they were defined by the injection cavities and the pairs of complementary blow half-molds define outer surfaces of the container that would have no outlet in the axial direction if they were defined by the blow cavities.

The complementary injection half-molds are cooled by cooling means comprising a cooling fluid circulating through cooling conduits arranged inside the complementary injection half-molds, and the complementary blow half-molds are cooled by cooling means comprising a cooling fluid circulating through cooling conduits arranged inside the complementary blow half-molds.

In that sense, unlike conventional injection and blow molding molds in which the vertical closure of the mold and of the machine is performed in a radial direction with respect to the preform and the container, generating a burr along the division line between the half-molds that follows the entire generatrix of the preform and the container, in the compact horizontal closing mold of the present invention, the closing direction is axial with respect to the preform and the container, allowing a significant portion of the preform and the container to be generated by a single cavity that has no has division lines and does not generate any burr on the generatrix in a lower region of the preform or the container which is molded in this single cavity.

With the mold of the present invention, the container that is obtained only has a circular burr in a highest possible portion of the container where the pair of complementary blow half-molds closes with respect to the single blow cavity, and burrs on the generatrix in an upper portion comprised between this circular burr and the mouth of the container along the closure line of the pair of complementary blow half-molds.

The height of the container where the division between the single blow cavity and the pair of complementary blow half-molds must be done is only limited by the presence of negative geometries in the container, which would not allow removing the container from the single blow cavity in an axial direction. For example, when the container has, in general, a cylindrical shape except in the neck and shoulder area, which is very common in containers for the pharmaceutical industry, the division line between the single blow cavity and the pair of complementary blow half-molds having a radial opening is located at the end of the shoulder, right at the point where the cylindrical area begins, and the pair of blow half-molds with a radial opening only generates the mouth, neck, and shoulder area of the container. In this case, the container obtained by means of the mold of the present invention does not have burrs along the entire cylindrical area.

BRIEF DESCRIPTION OF THE DRAWINGS

The foregoing and other features and advantages will be better understood based on the following detailed description of several merely illustrative and non-limiting embodiments in reference to the attached drawings, in which.

DETAILED DESCRIPTION OF SEVERAL EMBODIMENTS

Figure 1:
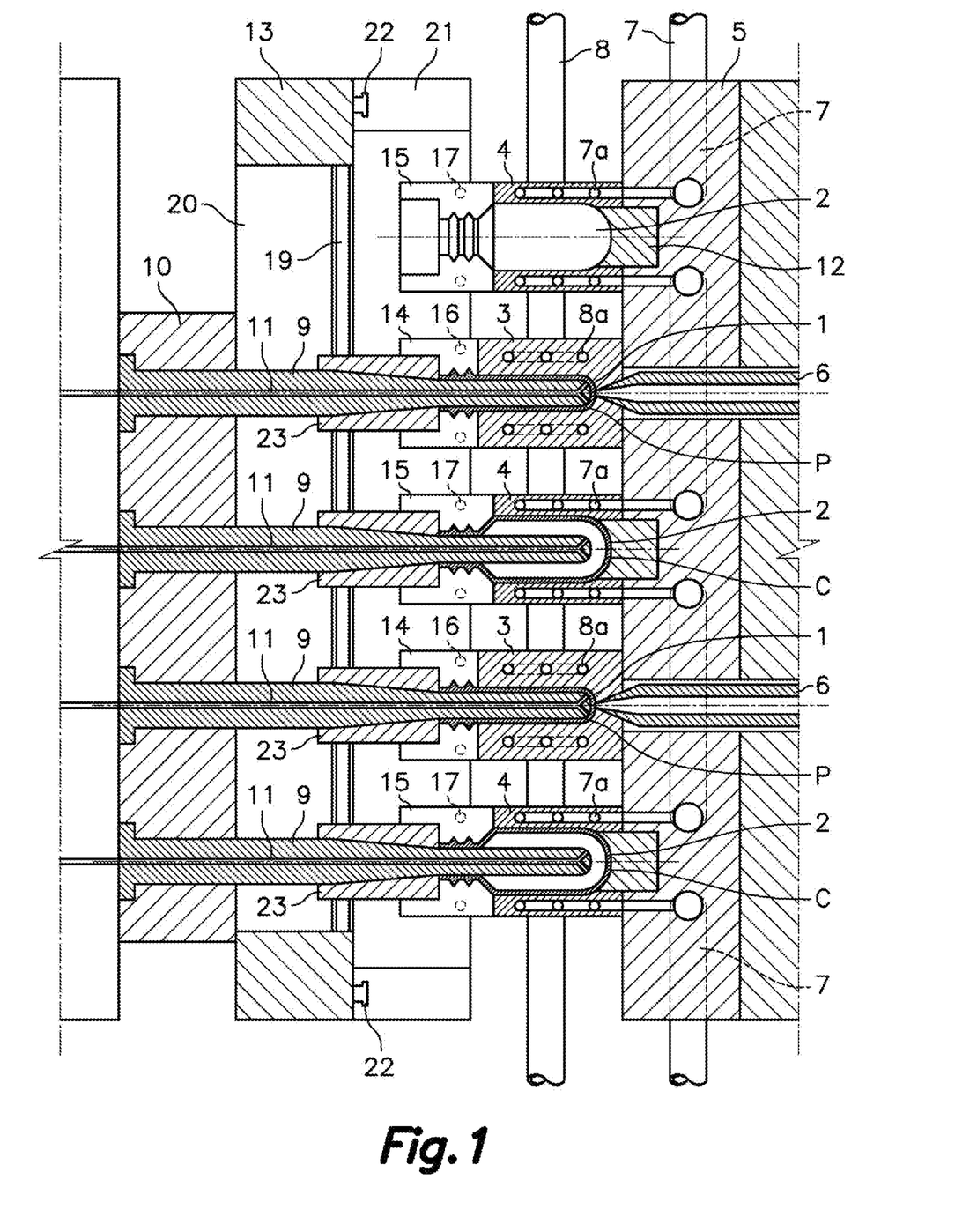
FIG. 1 is a schematic cross-section view of an injection and blow mold for an injection machine according to an embodiment of the present invention.

FIG. 1 shows an injection and blow mold for an injection machine according to an embodiment of the present invention, comprising one or more rows of molding cavities arranged in a base plate 5 and one or more rows of punches arranged in a movable plate 10.

Each row of molding cavities comprises a whole number n of injection cavities 1 that is greater than one and a number n+1 of blow cavities 2 arranged in an alternating manner and aligned with one another, with blow cavities 2 at opposite ends of the row. In each row, the injection cavities 1 and blow cavities 2 are separated from one another by regular distances. The injection cavities 1 define an outer surface of preforms P to be obtained and the blow cavities 2 define an outer surface of containers C to be obtained.

Figure 3:
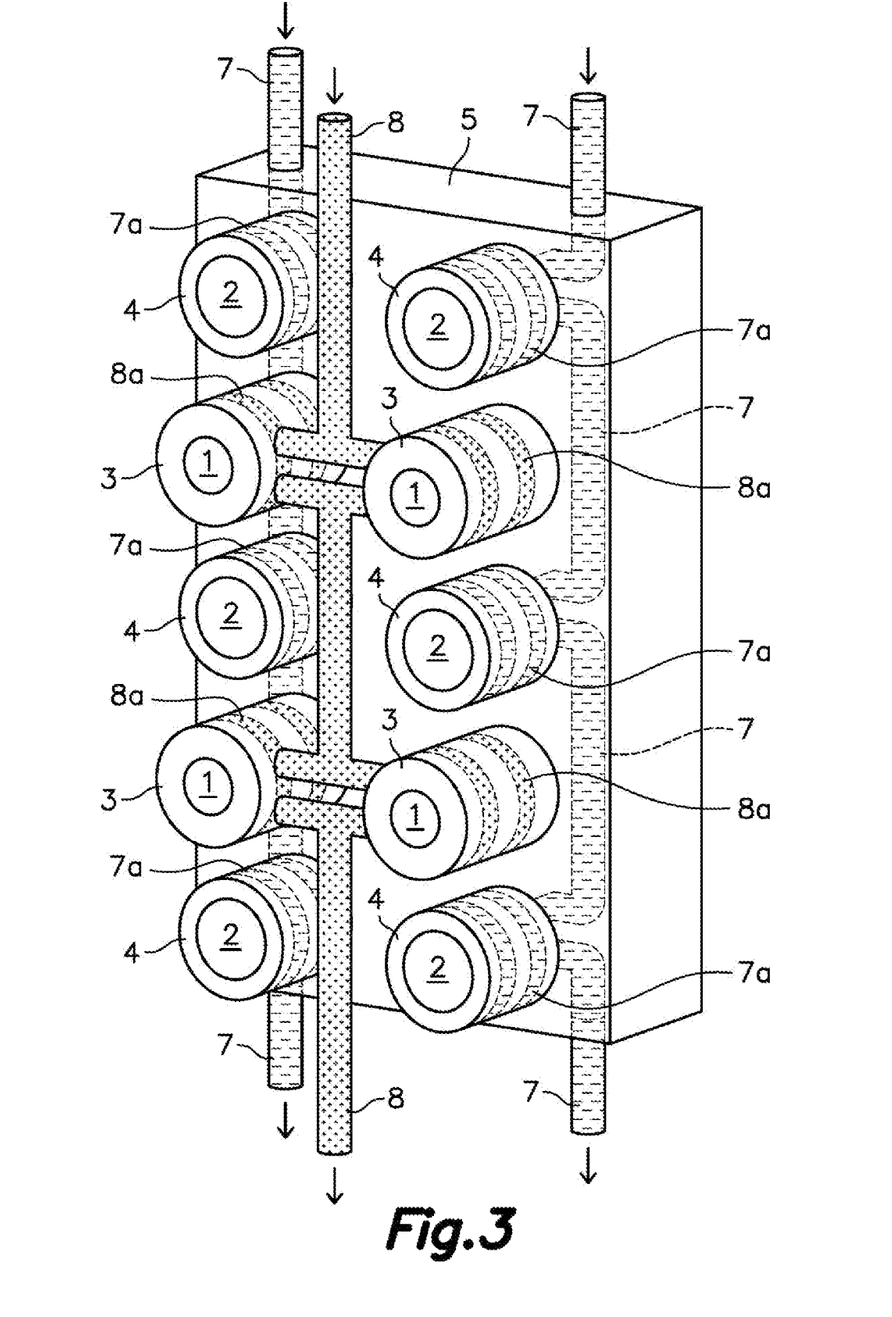
FIG. 3 is a perspective view illustrating a system for heating the injection blocks and cooling the blow blocks according to an embodiment.

By way of example, FIG. 3 shows a base plate 5 on which two vertical rows of molding cavities are arranged, and each row of molding cavities includes two injection cavities 1 and three blow cavities 2, which will provide four finished containers C in each molding cycle. Nevertheless, large base plates 5 may have up to eight vertical rows of molding cavities for small containers, with eight injection cavities 1 and nine blow cavities 2 in each row to produce 64 containers C in each molding cycle. This productivity can be doubled if the well known sandwich molding or stack molding technique is used.

Figure 2:
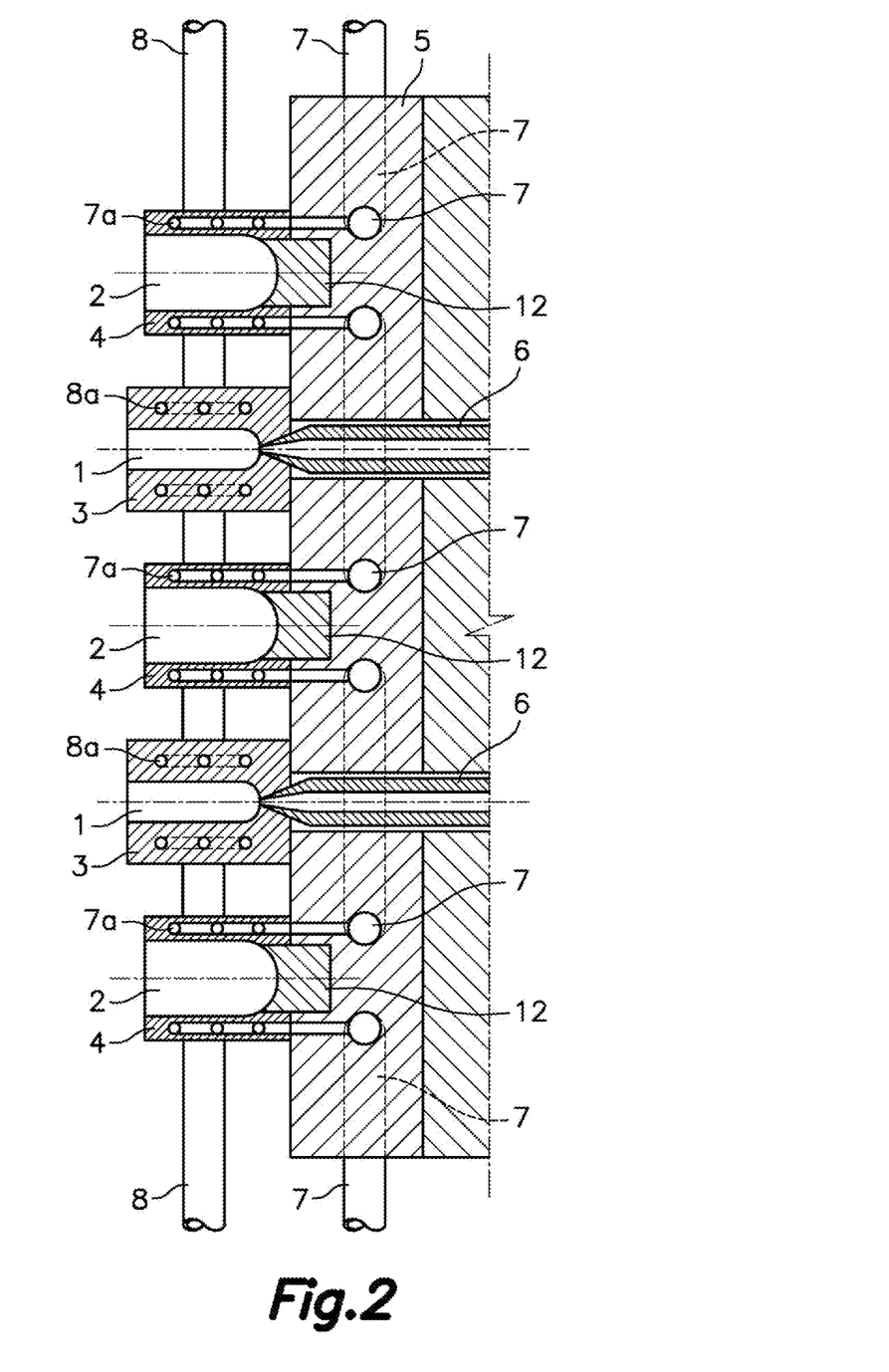
FIG. 2 is a schematic cross-section view of injection blocks and blow blocks arranged in a base plate which is part of the mold of FIG. 1.

As shown in FIGS. 1, 2, and 3 the injection cavities 1 are formed individually in respective injection blocks 3 fixed to the base plate 5 and the blow cavities 2 are formed individually in respective blow blocks 4 fixed to the base plate 5, such that the injection blocks 3 and blow blocks 4 are separated from one another and project from the base plate 5. For constructive purposes, in the shown embodiment the blow blocks 4 include a complementary part 12 partially embedded in the base plate 5. The complementary part 12 defines a portion of the outer surface of the container C corresponding to a base of the container C.

The base plate 5 has holes through which a plurality of injection nozzles 6 (FIGS. 1 and 2) supplying a molding material, such as a molten thermoplastic molding material, to the injection cavities 1 are arranged.

Each row of punches includes a number 2n of punches 9 arranged in a manner aligned with one another, said punches being separated from one another by regular distances equivalent to the gaps between the injection cavities and blow cavities in each row of cavities. The punches 9 define an inner surface of the preforms P. The movable plate 10 is provided with an opening and closing movement in a direction parallel to an axial direction, i.e., a direction parallel to central axes of the punches 9, and a transfer movement in a direction perpendicular to the axial direction and parallel to the row of punches 9.

By way of example, a movable plate 10 suitable for collaborating with a base plate 5 provided with the molding cavity arrangement described above in relation to FIG. 3 includes two vertical rows of punches 9 with four punches 9 in each row for a productivity of four containers C per molding cycle. A movable plate 10 suitable for collaborating with a base plate 5 provided with eight vertical rows of molding cavities, with eight injection cavities 1 and nine blow cavities 2 in each row like the one described above for small containers, includes eight vertical rows of punches 9 with 16 punches 9 in each row for a productivity of 64 containers C per molding cycle.

The mold furthermore includes a blow device blowing air into the preforms P in cooperation with a pressurised air supply device, and an ejection device ejecting finished containers C from the punches 9. The blow device includes air conduits 11 arranged inside the punches 9, and the air conduits 11 have outlets through which the air supplied by the pressurised air supply device is blown into the preforms. The ejection device includes injector elements 23 in the form of bushings arranged around the punches 9.

The movable plate 10 is associated with an intermediate plate 13 having a groove 20 through which the punches 9 are inserted, and the ejector elements 23 are linked to the intermediate plate 13 by guides 19 parallel to the direction of the row of punches arranged in the groove 20. The intermediate plate 13 performs the opening and closing movements together with the movable plate 10. However, the intermediate plate 13 is not provided with transfer movements like those of the movable plate 10. The punches 9 move along the groove 20 of the intermediate plate 13 when the movable plate 10 performs transfer movements.

To eject the finished containers C, the plate 10 performs an ejection movement in the axial direction, the intermediate plate 13 being separated when the intermediate plate 13 is in an open position, whereas the ejector elements remain linked to the intermediate plate 13 as a result of the coupling thereof to the guides 19. A selection device (not shown) causes the ejector elements 23 to eject only the finished containers C. A transfer device for transferring molded parts like the one described in the mentioned patent document EP 2678144 B1 would be suitable for cooperating with the base plate 10 of the present invention.

There are installed on the intermediate plate 13 one or more pairs of support members 21 coupled to guides 22 perpendicular to the axial direction and the direction of the row of punches 9, such that the pairs of support members 21 are provided with opening and closing movements in a radial direction in relation to the punches 9. The one or more pairs of support members 21 support one or more corresponding vertical rows of pairs of complementary half-molds, which are accordingly provided with the same opening and closing movements in the radial direction as the support members 21.

Each row of pairs of complementary half-molds includes a number n of pairs of complementary injection half-molds 14 and a number n+1 of pairs of complementary blow half-molds 15 arranged in an alternating manner and aligned with one another, with pairs of complementary blow half-molds 15 at opposite ends of the row. The pairs of complementary injection half-molds 14 are aligned with the injection cavities 1 and define outer surfaces of the preform P that would have no outlet in the axial direction if they were defined by the injection cavities 1. The pairs of complementary blow half-molds 15 are aligned with the blow cavities 2 and define outer surfaces of the container C that would have no outlet in the axial direction if they were defined by the blow cavities 2.

Only one member of each pair of support members 21, of each pair of complementary injection half-molds 14, and of each pair of complementary blow half-molds 15 is visible in FIG. 1 because the cross-section view is taken along a plane containing the planes of division of the half-molds.

There are arranged inside the injection blocks 3 heating conduits 8a which are in fluid communication with distribution tubes 8 arranged outside the base plate 5. A heating fluid distribution device circulates a heated heating fluid along the distribution tubes 8 and the heating conduits 8a such that the injection blocks 3 are heated without the heat provided by the heating fluid reaching the base plate 5. Alternative heating means may comprise electrical resistances (not shown) arranged in thermal contact with the injection blocks 3 with an equivalent result.

There are arranged inside the blow blocks 4 cooling conduits 7a which are in fluid communication with distribution conduits 7 arranged inside the base plate 5. A cooling fluid distribution device circulates a cooled cooling fluid along the distribution conduits 7 and the cooling conduits 7a such that the cooled blow blocks 4 and the base plate 5 are kept at a constant low temperature, assuring accuracy and stability in the position coordinates of both the injection cavities 1 and the blow cavities 2. Alternatively, the distribution conduits 7 of the cooling fluid may be arranged outside the base plate 5.

Both the complementary injection half-molds 14 and the complementary blow half-molds 15 are cooled by cooling means for the purpose of assuring that part of the preform P and the container C corresponding to the mouth and neck, which is not subject to blowing, cools down rapidly and remains cold to prevent undesired deformations thereof. To that end, cooling conduits 16 receiving the cooled cooling fluid from the cooling fluid distribution device are arranged inside the complementary injection half-molds 14, and cooling conduits 17 also receiving the cooled cooling fluid from the cooling fluid distribution device are arranged inside the complementary blow half-molds 15.

Figure 4:
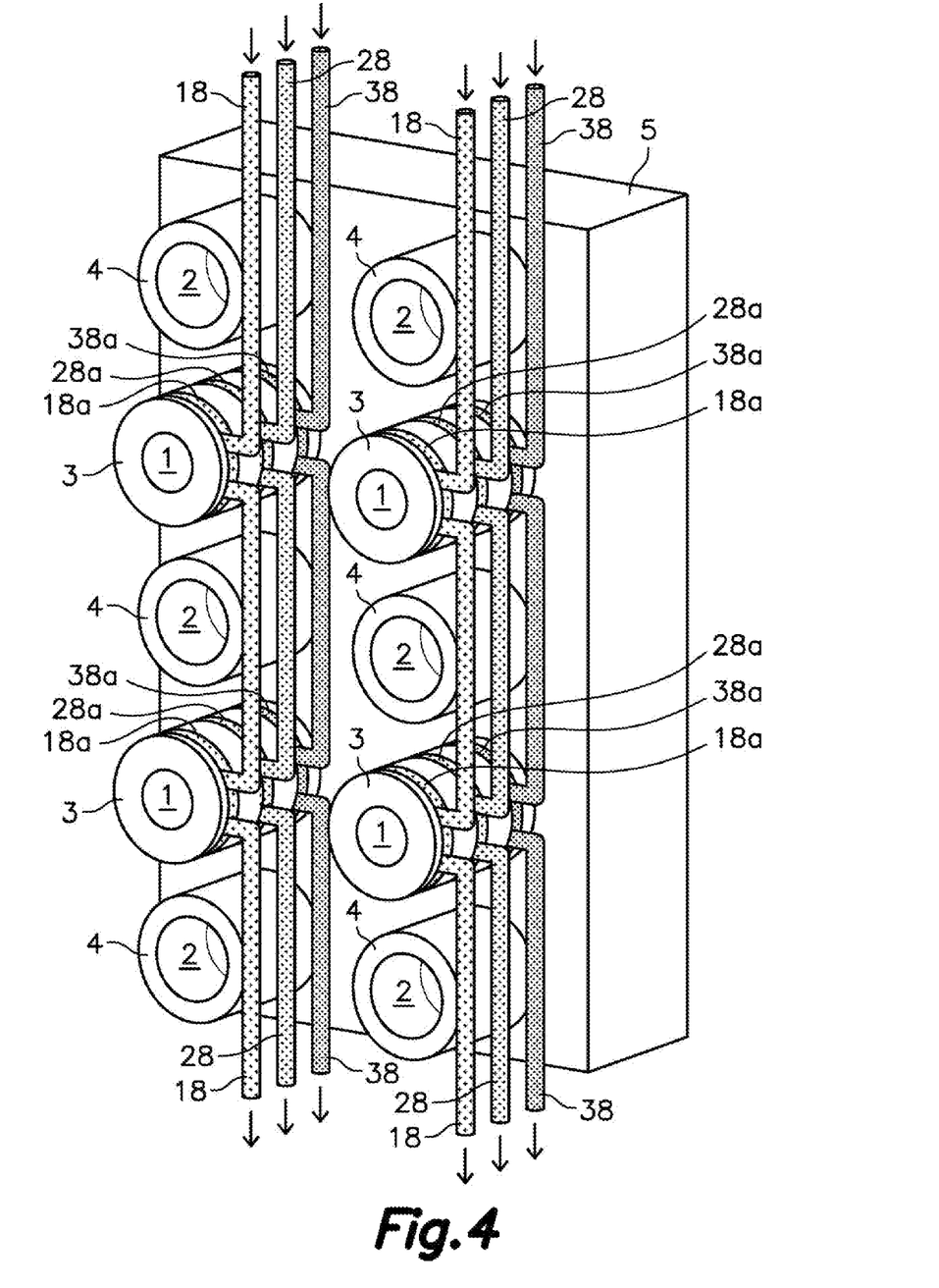
FIG. 4 is a perspective view illustrating a system for heating the injection blocks according to another alternative embodiment.

FIG. 4 schematically illustrates an alternative embodiment of the heating system of the injection blocks 3, where three circuits of independent heating conduits 18a, 28a, 38a are arranged inside each of the injection blocks 3 in relation to different regions thereof, for example, on three different levels in the axial direction with respect to the corresponding injection cavity 1. These three circuits of heating conduits 18a, 28a, 38a are in fluid communication with three independent distribution tubes 18, 28, 38, respectively, arranged outside the base plate 5.

The heating fluid distribution device circulates a heating fluid heated to three different temperatures along the three distribution tubes 18, 28, 38 and the three circuits of heating conduits 18a, 28a, 38a of each injection block 3, such that different regions of the injection blocks 3 are heated to different temperatures without the heat provided by the heating means reaching the base plate 5.

For the sake of clarity, the system for cooling the blow cavities 2 is not depicted in the base plate 5. However, the system for cooling the blow cavities 2 in the base plate 5 of FIG. 4 can be the same as that described above in relation to FIG. 3. Alternatively, in both embodiments shown in FIGS. 3 and 4, the system for cooling the blow cavities 2 can comprise distribution tubes (not shown) arranged outside the base plate and suitably connected for circulating the cooled cooling fluid through the cooling conduits 7a arranged inside the blow blocks 4.

Figure 5:
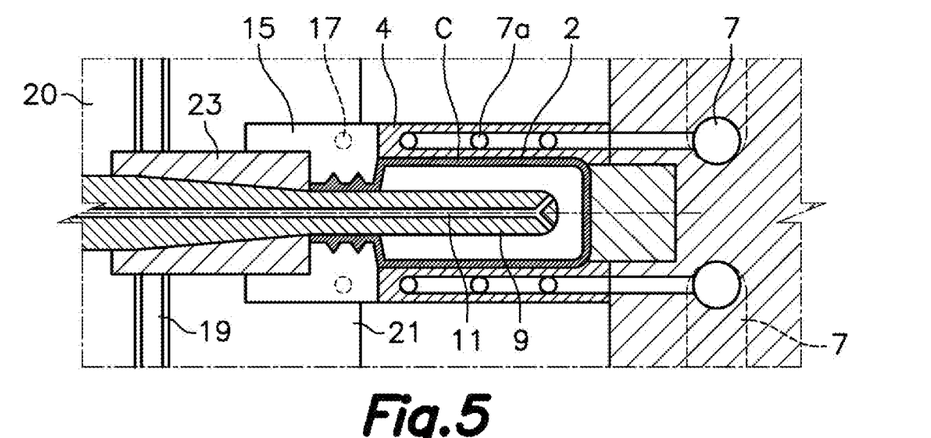
FIGS. 5 to 7 are cross-section views illustrating different ways of dividing the blow molds according to the shapes of different containers to be obtained.
Figure 6:
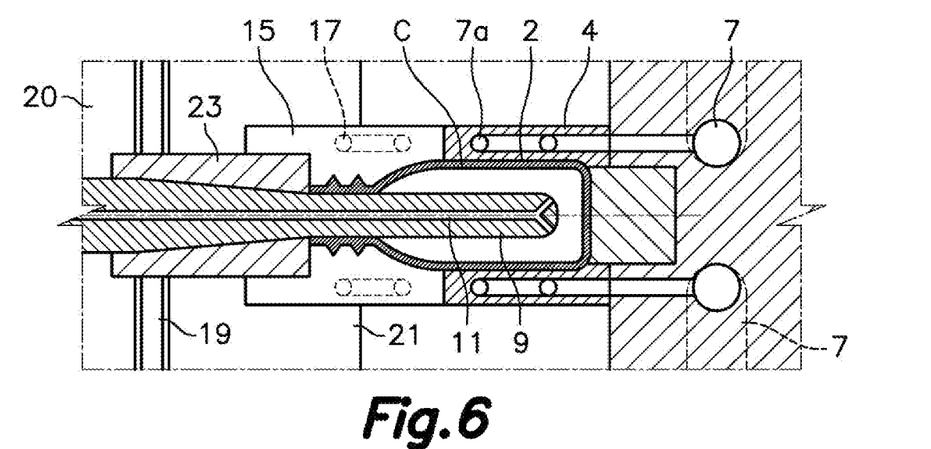
Figure 7:
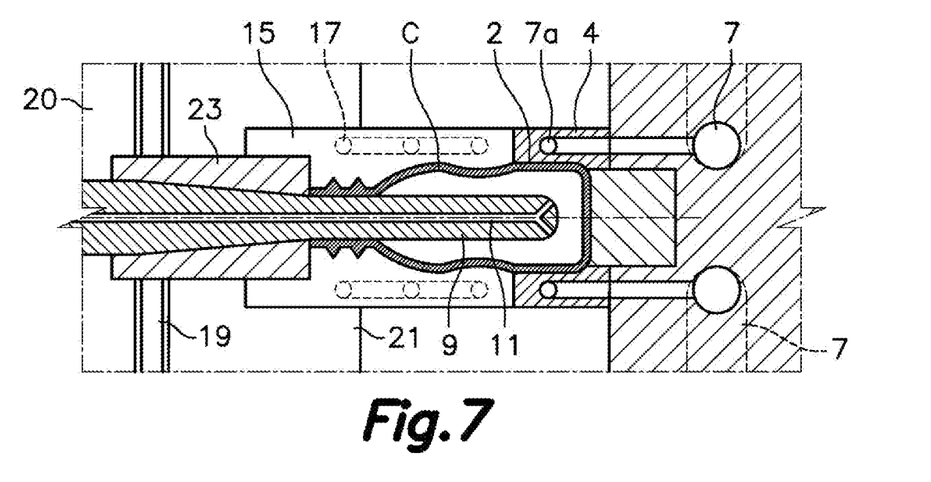

FIGS. 5, 6, and 7 illustrate different molds in which the blow cavity 2 of each blow block 4 and the corresponding pair of complementary blow half-molds 15 having a radial opening define, in cooperation with the punch 9, respective blow molds for molding containers C having different shapes, where the blow cavity 2 defines the outer surface of a region of the container C which can be removed in an axial direction, and the complementary blow half-molds 15 define the outer surface of another region of the container C which cannot be removed in the axial direction due to its negative configuration. Accordingly, the division line between the blow cavity 2 and the pair of complementary blow half-molds 15 is located right at the point where the region which can be removed in the axial direction ends and the region which cannot be removed in the axial direction begins.

In the example shown in FIG. 5, a region of the container C including the mouth, the neck, and a steep shoulder, which cannot be removed in the axial direction, has a much shorter length in the axial direction than another region of the container C including virtually the entire vessel body and the base, which can be removed in the axial direction. In this case, the division line between the blow cavity 2 and the pair of complementary blow half-molds 15 is located relatively close to the neck of the container C, and accordingly, the container C that is obtained will not have burrs in the vessel body.

In the example shown in FIG. 6, the container has a relatively smooth shoulder covering an upper portion of the vessel body. Accordingly, the region of the container C including the mouth, the neck, and the shoulder, which cannot be removed in the axial direction, has almost the same length in the axial direction as the region including the rest of the vessel body and the base, which can be removed in the axial direction. In this case, the division line between the blow cavity 2 and the pair of complementary blow half-molds 15 is located at half the height of the container C, and accordingly, the container C that is obtained will not have burrs only in the cylindrical portion of the vessel body.

In the example shown in FIG. 7, below a relatively smooth shoulder, the container has a concave area covering a middle portion of the vessel body. Accordingly, the region of the container C including the mouth, the neck, the shoulder, and the concave area, which cannot be removed in the axial direction, has a length in the axial direction much longer than the region including the rest of the vessel body and the base, which can be removed in the axial direction. In this case, the division line between the blow cavity 2 and the pair of complementary blow half-molds 15 is located relatively close to the base of the container C, and accordingly, the container C that is obtained will not have burrs only in the short cylindrical portion of the vessel body.

What is claimed is:

1. An injection and blow mold for an injection machine, comprising:
    one or more rows of molding cavities arranged in a base plate, each row of molding cavities including a whole number n of injection cavities that is greater than one and a number n+1 of blow cavities arranged in an alternating manner and aligned with one another, with blow cavities at opposite ends of the row, where the injection cavities define an outer surface of preforms to be obtained and the blow cavities define an outer surface of containers to be obtained;
    a plurality of injection nozzles supplying a molten molding material to the injection cavities;
    one or more rows of punches arranged in a movable plate, each row of punches including a number 2n of punches arranged in a manner aligned with one another, said movable plate being provided with an opening and closing movement in a direction parallel to an axial direction relative to said punches and a transfer movement in a direction perpendicular to said axial direction and parallel to said row of punches, where the punches define an inner surface of said preforms;
    a blow device blowing air into the preforms from outlets of air conduits arranged inside the punches; and
    an ejection device ejecting finished containers from the punches by means of ejector elements,
    wherein:
    said injection cavities are formed in injection blocks and said blow cavities are formed in blow blocks;
    said injection blocks and said blow blocks are separated from one another and project from said base plate;
    the injection blocks are heated by a heating fluid circulating through heating conduits arranged inside the injection blocks;
    said heating fluid is supplied to said heating conduits through distribution tubes arranged outside the base plate; and
    the blow blocks are cooled by cooling elements.

2. The injection and blow mold according to claim 1, wherein a plurality of circuits of independent heating conduits are arranged inside each of the injection blocks in relation to different regions of the injection block and said plurality of circuits of heating conduits are in fluid communication with corresponding independent distribution tubes arranged outside the base plate, and a heating fluid heated to a plurality of different respective temperatures circulates through said distribution tubes and through the corresponding circuits of heating conduits.

3. The injection and blow mold according to claim 1, wherein said cooling elements comprise a cooling fluid circulating through cooling conduits arranged inside the blow blocks.

4. The injection and blow mold according to claim 3, wherein said cooling fluid is supplied to said cooling conduits through distribution conduits arranged inside the base plate.

5. The injection and blow mold according to claim 3, wherein said cooling fluid is supplied to said cooling conduits through distribution tubes arranged outside the base plate.

6. The injection and blow mold according to claim 1, wherein the movable plate is associated with an intermediate plate having installed thereon one or more rows of pairs of complementary half-molds provided with opening and closing movements in a radial direction relative to the punches, each row of pairs of complementary half-molds including a number n of pairs of complementary injection half-molds and a number n+1 of pairs of complementary blow half-molds arranged in an alternating manner and aligned with one another, with pairs of complementary blow half-molds at opposite ends of the row, where the pairs of complementary injection half-molds define outer surfaces of the preform that would have no outlet in the axial direction if they were defined by the injection cavities and the pairs of complementary blow half-molds define outer surfaces of the container that would have no outlet in the axial direction if they were defined by the blow cavities, where the complementary injection half-molds and the complementary blow half-molds are cooled by cooling elements.

7. The injection and blow mold according to claim 6, wherein said cooling elements comprise a cooling fluid circulating through cooling conduits arranged inside the complementary injection half-molds.

8. The injection and blow mold according to claim 6, wherein said cooling elements comprise a cooling fluid circulating through cooling conduits arranged inside the complementary blow half-molds.

9. The injection and blow mold according to claim 1, wherein
each injection block has an individual injection cavity formed therein and each blow block has an individual blow cavity formed therein.

10. An injection and blow mold for an injection machine, comprising:
one or more rows of molding cavities arranged in a base plate, each row of molding cavities including a whole number n of injection cavities that is greater than one and a number n+1 of blow cavities arranged in an alternating manner and aligned with one another, with blow cavities at opposite ends of the row, where the injection cavities define an outer surface of preforms to be obtained and the blow cavities define an outer surface of containers to be obtained;
a plurality of injection nozzles supplying a molten molding material to the injection cavities;
one or more rows of punches arranged in a movable plate, each row of punches including a number 2n of punches arranged in a manner aligned with one another, said movable plate being provided with an opening and closing movement in a direction parallel to an axial direction relative to said punches and a transfer movement in a direction perpendicular to said axial direction and parallel to said row of punches, where the punches define an inner surface of said preforms;
a blow device blowing air into the preforms from outlets of air conduits arranged inside the punches; and
an ejection device ejecting finished containers from the punches by means of ejector elements,
wherein:
said injection cavities are formed in injection blocks and said blow cavities are formed in blow blocks;
said injection blocks and said blow blocks are separated from one another and project from said base plate;
the injection blocks are heated by a heating fluid circulating through heating conduits arranged inside the injection blocks; and
the blow blocks are cooled by cooling elements
wherein a plurality of circuits of independent heating conduits are arranged inside each of the injection blocks in relation to different regions of the injection block and said plurality of circuits of heating conduits are in fluid communication with corresponding independent distribution tubes arranged outside the base plate, and a heating fluid heated to a plurality of different respective temperatures circulates through said distribution tubes and through the corresponding circuits of heating conduits.

11. The injection and blow mold according to claim 10, wherein said cooling elements comprise a cooling fluid circulating through cooling conduits arranged inside the blow blocks.

12. The injection and blow mold according to claim 11, wherein said cooling fluid is supplied to said cooling conduits through distribution conduits arranged inside the base plate.

13. The injection and blow mold according to claim 11, wherein said cooling fluid is supplied to said cooling conduits through distribution tubes arranged outside the base plate.

14. The injection and blow mold according to claim 10, wherein the movable plate is associated with an intermediate plate having installed thereon one or more rows of pairs of complementary half-molds provided with opening and closing movements in a radial direction relative to the punches, each row of pairs of complementary half-molds including a number n of pairs of complementary injection half-molds and a number n+1 of pairs of complementary blow half-molds arranged in an alternating manner and aligned with one another, with pairs of complementary blow half-molds at opposite ends of the row, where the pairs of complementary injection half-molds define outer surfaces of the preform that would have no outlet in the axial direction if they were defined by the injection cavities and the pairs of complementary blow half-molds define outer surfaces of the container that would have no outlet in the axial direction if they were defined by the blow cavities, where the complementary injection half-molds and the complementary blow half-molds are cooled by cooling elements.

15. The injection and blow mold according to claim 14, wherein said cooling elements comprise a cooling fluid circulating through cooling conduits arranged inside the complementary injection half-molds.

16. The injection and blow mold according to claim 14, wherein said cooling elements comprise a cooling fluid circulating through cooling conduits arranged inside the complementary blow half-molds.

17. The injection and blow mold according to claim 10, wherein each injection block has an individual injection cavity formed therein and each blow block has an individual blow cavity formed therein.

* * * * *